US007873158B2

(12) United States Patent
Sharma et al.

(10) Patent No.: US 7,873,158 B2
(45) Date of Patent: Jan. 18, 2011

(54) POLLED GEOFENCING AND DISTINGUISHED RING-BACK

(75) Inventors: Ranjan Sharma, New Albany, OH (US); Shengqiang Wang, Cary, NC (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1034 days.

(21) Appl. No.: 11/444,105

(22) Filed: May 31, 2006

(65) Prior Publication Data

US 2007/0280448 A1    Dec. 6, 2007

(51) Int. Cl.
H04M 3/00    (2006.01)
(52) U.S. Cl. ............... 379/386; 455/456.2; 379/102.06; 379/373.02; 379/201.07
(58) Field of Classification Search ............ 379/207.12, 379/201.09, 67.1, 100.06, 257; 455/412.1, 455/412.2, 456.2
See application file for complete search history.

(56) References Cited

U.S. PATENT DOCUMENTS

| 5,889,474 | A  | * | 3/1999 | LaDue ................... 340/825.49 |
| 6,072,396 | A  | * | 6/2000 | Gaukel ..................... 340/573.4 |
| 6,243,039 | B1 | * | 6/2001 | Elliot ......................... 342/457 |
| 6,838,998 | B1 | * | 1/2005 | Brown et al. ........... 340/825.49 |
| 2003/0002657 | A1 | * | 1/2003 | Seelig et al. ........... 379/373.01 |
| 2003/0086558 | A1 | * | 5/2003 | Seelig et al. ........... 379/373.01 |
| 2004/0164867 | A1 | * | 8/2004 | Jormalainen ............. 340/573.4 |
| 2006/0147012 | A1 |   | 7/2006 | Moody et al. |
| 2007/0191025 | A1 | * | 8/2007 | McBrierty et al. ....... 455/456.2 |

FOREIGN PATENT DOCUMENTS

| EP | 1 517 527 | 3/2005 |
| JP | 2006 074133 | 3/2006 |
| WO | WO 2006/135592 | 12/2006 |

* cited by examiner

*Primary Examiner*—Fan Tsang
*Assistant Examiner*—Kharye Pope
(74) *Attorney, Agent, or Firm*—Carmen Patti Law Group, LLC

(57) ABSTRACT

The apparatus may have: a telecommunication network having a tracking calling terminal and a tracked called terminal; a polled geofencing system associated with at least one predetermined area having a predetermined boundary, the tracked called terminal having a location relative to the predetermined boundary; and at least first and second predetermined ring-back tones having a functional relationship with the at least one predetermined boundary, the first predetermined ring-back tone being utilized when the tracked called terminal is within the predetermined boundary, and the second predetermined ring-back tone being utilized when the tracked called terminal is outside of the predetermined boundary; wherein the at least first and second predetermined ring-back tones alert the tracking calling terminal to a location, relative to the predetermined boundary as determined by the polled geofencing system, of tracked called terminal during a call setup between the designated tracked called terminal and the tracking calling terminal.

23 Claims, 5 Drawing Sheets

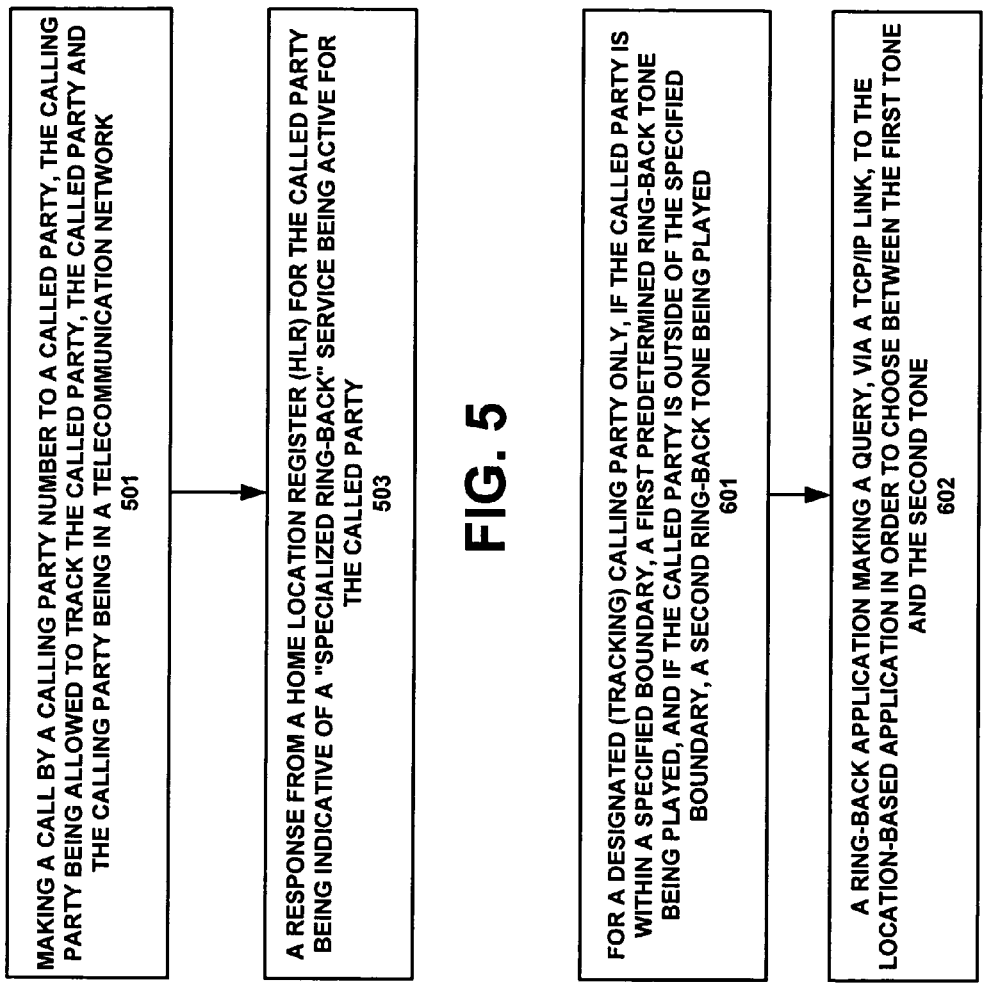

_US 7,873,158 B2_

POLLED GEOFENCING AND DISTINGUISHED RING-BACK

TECHNICAL FIELD

The invention relates generally to polled geofencing techniques, and in particular to the use of distinguished ring-back tones upon calling a tracked or fenced party.

BACKGROUND

Ring-back tones provide a personalization service, which replaces the standard ring-back tone for calling parties (including friends and family) to enjoy. With this service a subscriber may choose, for example, a song for callers to hear before the subscriber picks up the call. The song plays in the call setup phase, also known as the "ringing" phase.

Typically, ring-back tones may be purchased through the Internet, over the phone and through text messages. Some services may offer the ability to specify a unique ring-back tone to be played conditionally (such as during a specific time period, on a specific day of the week, during a date range, for callers from a specific NPA etc.). A default ring-back tone may be played during all other times. Ring-back tones may be offered, for example, for different music genres, such as, Rap/Hip-Hop, Pop, Rock, R&B, Alternative, Metal, Classic Rock, Soundtracks & Themes, Country, Voice Tones, Dance, Electronic, Folk, 60's, 70's, 80's, Oldies, Blues, Jazz, Inspirational, World, Latin, Holiday, Sports, TV/Movies, VH1, Comedy Central, etc. Also, a unique ring-back tone may be designated for specific callers or groups of callers.

Specialized ring-back tones were introduced for wireless and wire-line telecommunications service providers a couple years back. It is typical to find that these service providers allow subscribers to choose specialized ring-back tones from a repository containing tens of thousands of ring-back tones. As the foregoing indicates, this service is geared towards consumer or mass market.

A geofence is a geographic boundary or boundaries that, for example, a customer's mobile assets are permitted to roam. A geofence boundary is a closed polygon or radius. If the asset is within the boundary you are in geofence compliance, outside the boundary you are in geofence violation.

In contrast to a ring-back service, geofencing is geared towards a different segment of users. In general, it requires the use of a desktop, or a handheld smart device, to track a specific person or object in motion, for example. It is considered a very technical application, generally not suitable for the common population.

SUMMARY

One embodiment of the present method and apparatus encompasses an apparatus. In this embodiment the apparatus may comprise: a polled geofencing system associated with at least one predetermined area having a predetermined boundary; and at least one predetermined specialized ring-back tone having a functional relationship with the at least one predetermined boundary; wherein the at least one predetermined specialized ring-back tone alerts a designated calling party to a location, relative to the at least one predetermined boundary as determined by the polled geofencing system, of a called party during a call setup between the designated calling party and the called party.

Another embodiment of the present method and apparatus encompasses a method. This embodiment of the method may comprise: determining that a ring-back service is active for a call; extending the call to a ring-back tone platform and determining applicability of geofencing; obtaining a fix on a called mobile terminal; determining a location of the called mobile terminal with respect to the geofence; and playing a relevant ring-back tone for the call based on the location of the called mobile terminal.

DESCRIPTION OF THE DRAWINGS

Features of exemplary implementations of the invention will become apparent from the description, the claims, and the accompanying drawings in which:

FIG. 5 depicts the FIG. 4 step of determining that a ring-back service is active for a call;

FIG. 6 depicts the FIG. 4 step of extending the call to a ring-back tone platform and determining applicability of geofencing;

DETAILED DESCRIPTION

A CDMA network is used as an example in the present embodiment of the present method and apparatus, however, it is only one of several possible embodiments. The present disclosure applies equally to other networks. These networks can range from GSM/GPRS/UMTS networks to harmonized 3GPP/3GPP2 IMS networks. The disclosure is also independent of air-interface, and hence, equally applicable to available air interfaces and newer interfaces as they develop.

Geofencing is an application of Geographic Information Systems and location of an object, where the movement of the object into (or out of) a pre-defined area is used as a trigger for an application. Applications can locate the objects using different techniques from a cell location (for a rough order of magnitude location) to a global positioning system (for a location determination precise to several meters). The pre-defined area is drawn up using a location-based application via a set of coordinates (e.g., Latitude, Longitude). This technique is used in areas of fleet-management and has multiple applications, for example, tracking rental vehicles that have been rented for in-state/in-country use only, shipment tracking at specific check-points, ensuring that valuable goods are being transported along a pre-defined and secure route only, etc.). Geofencing is not an obvious choice for casual usage.

Specialized ring-back tones have been introduced for wireless and wire-line telecommunications service providers. The use of the specialized ring-back tone lets a subscriber define what the calling party hears during a ringing (call set-up) phase. Specialized ring-back tones range from a clip from a popular song, to a famous dialogue from a film, to a personalized and self-created content. A subscriber is free to define different ring-back tones for different callers, and even different ring-back tones for the same calling party for different days of the week, or time of the day, etc. Unlike downloadable ring-tones, the ring-back tones are experienced by calling parties and are served by the network (that is, they are not stored on end-user devices). Ring-back tones are not an obvious choice for serious usage; rather, they provide a fashion statement and a window to the taste of the subscriber.

Embodiments of the present method and apparatus combine these two elements to provide a useful application for casual usage of geofencing combined with a serious usage of ring-back tones. The application provides geofencing functionality and indicates in-bounds/out-of-bounds situations for a tracked mobile device.

Figure 1:
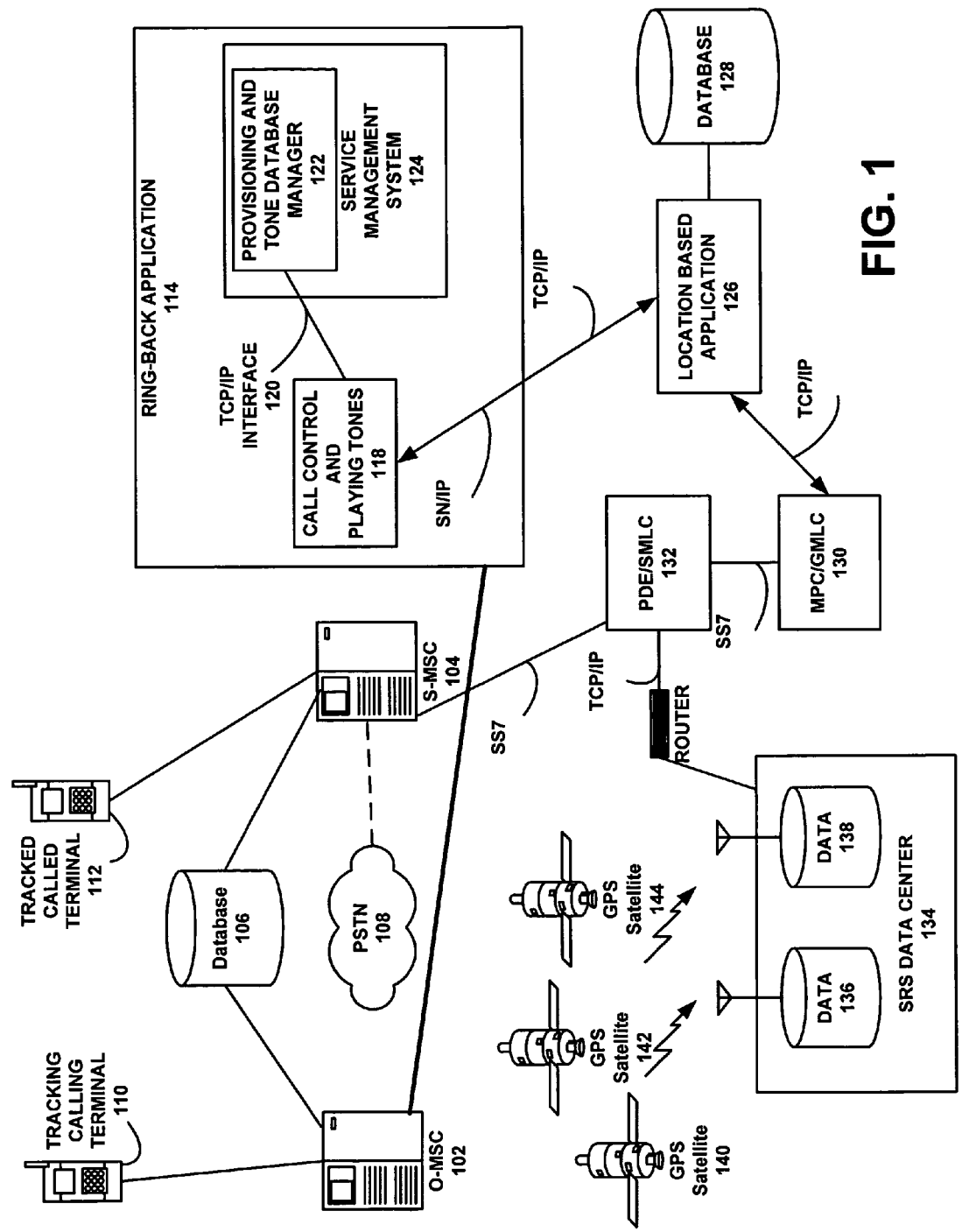
FIG. 1. depicts a telecommunication network 100 in which is utilized an embodiment of the present method and application.

FIG. 1. depicts a telecommunication network 100 in which is utilized an embodiment of the present method and application. Only relevant portions of the telecommunication network 100 are depicted. An originating mobile switching center (O-MSC) 102 may be operatively coupled to a serving mobile switching center (S-MSC) 104 via at least a database 106. The S-MSC 104 may also be operatively coupled to a public switched telephone network (PSTN) 108. A tracking calling terminal 110 may be operatively coupled to the O-MSC 102, and a tracked called terminal 112 may be operatively coupled to the S-MSC 104. This represents the roaming scenario, where, a called party is not in the home region served by the O-MSC 102.

Typically, service providers prefer to have the O-MSC 102 interact with ring-back application 114 for several reasons; a ring-back tone may be served quicker to the calling party, and it is not necessary to depend on S-MSC 104 capabilities, this is especially important when one takes into account a roaming agreement between multiple service providers. Therefore, the ring-back tone application 114 is operatively coupled to the O-MSC 102 rather than the S-MSC 104. As depicted the ring-back application 114 may have call control and playing tones module 118 that is operatively coupled, via a TCP/IP (transmission control protocol/Internet protocol) interface 120 to a provisioning and tone database manger 122 in a service management system 124.

A location based application 126 may be operatively coupled to the call control and playing tomes module 118 via TCP/IP. The location based application 126 may be operatively coupled to a database 128. The location based application 126 is also operatively coupled to the S-MSC 104 via a Mobile Positioning Center (MPC)/Gateway Mobile Location Center (GMLC) 130 and a Position Determination Equipment (PDE)/Service Mobile Location Center (SMLC) 132 using TCP/IP and SS7 messaging as depicted in FIG. 1. A SRS (shared registration service) data center 134 may have databases 136, 138 that store location information from GPS satellites 140, 142, 144. A router 146 operatively couples the SRS data center 134 to the PDE/SMLC 132 via TCP/IP.

The technique of polled geofencing combined with distinguished ring-back tones alerts a designated calling party to the whereabouts of the called party during the call setup (ringing) phase via audible ring-back tones that signify the location of the called party, as tracked against a pre-defined area or boundary. For example, a parent might impose a 10 mile radius as the bounds for a teenage son, who has recently started driving. When the parent makes a call to the mobile phone in possession of this teenage son, the specialized ring-back tone may signify to the parent whether the called device is within the imposed boundary or outside of it. Similarly, a parent may designate a route for the teenage son to follow on the way to school and may check on them periodically to ensure their safety, the ring-back tone may indicate if the designated route is being followed. In certain other cases, the called (tracked) party may not be in a position to divulge his/her location either because it is not known or because he/she is not allowed to provide this fact to the calling party. In such cases also, the calling party can make a quick determination if the agreed-to and pre-determined route is being followed by the called party.

Figure 2:
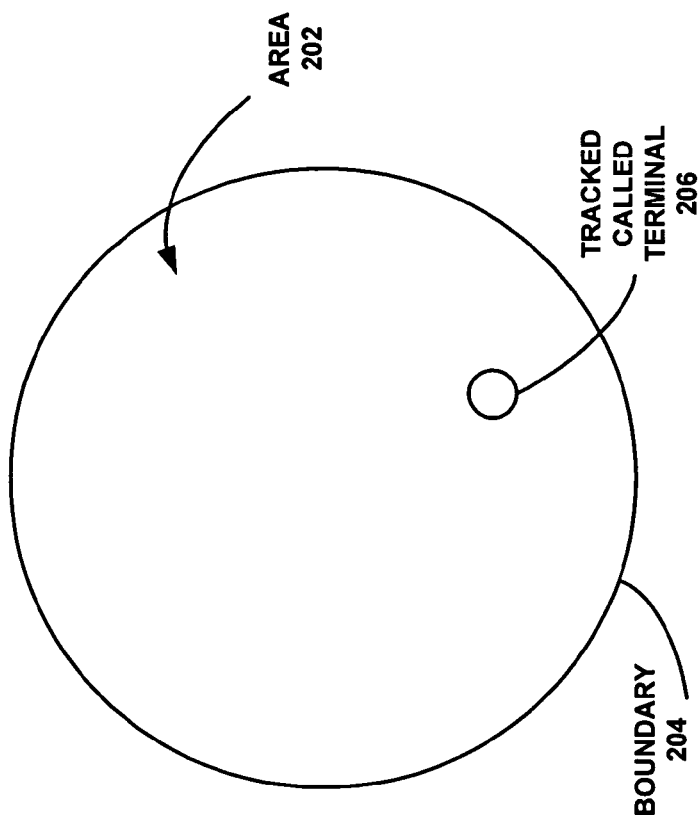
FIG. 2 depicts an area having a boundary, and a tracked called terminal currently inside of the boundary.

For example, FIG. 2 depicts an area 202 having a boundary 204. As depicted a tracked called terminal 202 is currently inside of the boundary 204.

Figure 3:
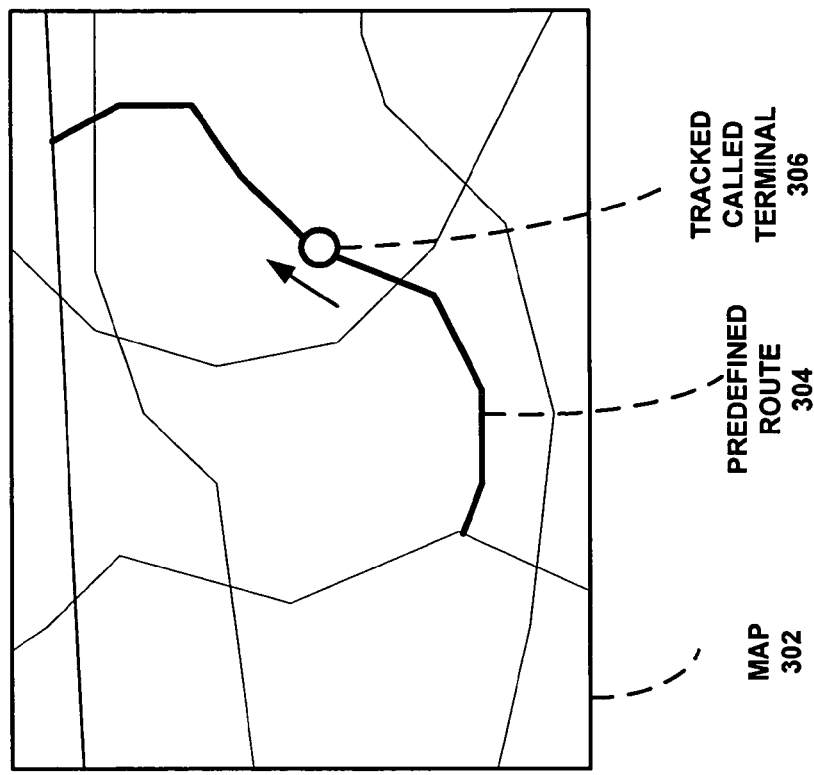
FIG. 3 depicts a map having a predetermined route along which a tracked called terminal traverses.

FIG. 3 depicts a map 302 having a predetermined route 304 along which a tracked called terminal 306 travels.

Figure 4:
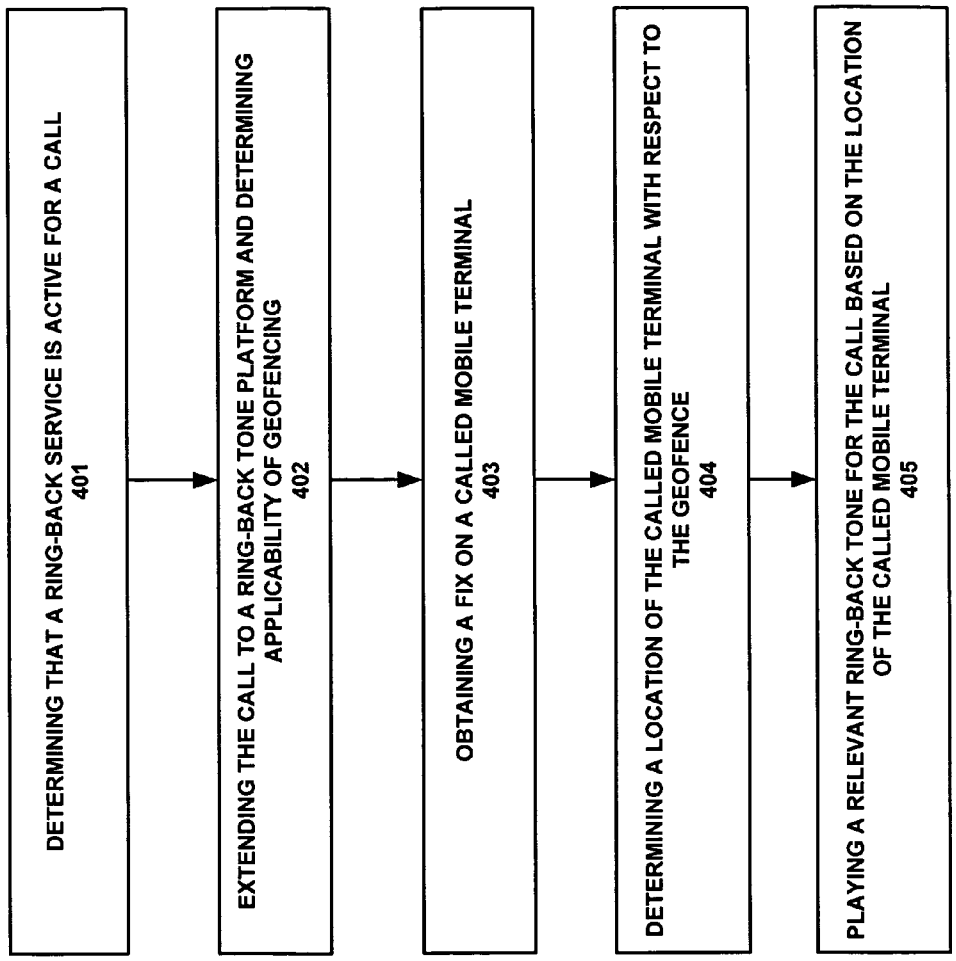
FIG. 4 depicts an embodiment of the present method.

FIG. 4 depicts an embodiment of the present method. This embodiment may have the steps of; determining that a ring-back service is active for a call (401); extending the call to a ring-back tone platform and determining applicability of geofencing (402); obtaining a fix on a called mobile terminal (403); determining a location of the called mobile terminal with respect to a geofence (404); and playing a relevant ring-back tone for the call based on the location of the called mobile terminal (405).

FIG. 5 depicts the FIG. 4 step of determining that a ring-back service is active for a call.

In this embodiment of the present method and apparatus a called party, such as a called mobile terminal, and a calling party, such as a calling mobile terminal, may be part of a CDMA wireless network. The calling party, who is allowed to track the called party, makes a call to the called party number (501). A "specialized ring-back" service is active for the called party, based on a response received from a home location register (HLR) (502). Actually, the network just knows that there is an active trigger. It does not know if the trigger is meant for a ring-back service or some other processing. Therefore, the network can't truly know if a "specialized ring-back" service is active for the called party or not. For example, upon a call arrival, an originating mobile switching center detects a Mobile Termination Trigger and launches a LocationRequest Invoke message to the HLR associated with the called mobile terminal. When the HLR returns a LocationRequest Return Result message with AdvancedTerminationTrigger (ATT) in a TriggerAddressList, the O-MSC launches a AnalyzedInformation Invoke message to the identified Call Controller platform. The call controller, for example, a "SN/IP" (Service Node/Intelligent Peripheral), handles the call processing and determines that the call warrants a specialized ring-back tone to be played for the call.

FIG. 6 depicts the FIG. 4 step of extending the call to a ring-back tone platform and determining applicability of geofencing.

The ring-back tone determination may be conditional or unconditional. In the present embodiment, the ring-back tone determination may be represented as follows. For a designated (tracking) calling party only, if the called party is within a specified boundary, a first predetermined ring-back tone is played, and if the called party is outside of the specified boundary, a second ring-back tone is played (601). At this stage, the ring-back application "knows" that it would have to involve the geofencing application in order to choose between the first tone and the second tone. The ring-back application then makes a query, via a TCP/IP link, to the location-based application (602).

Figures 7, 8, 9:
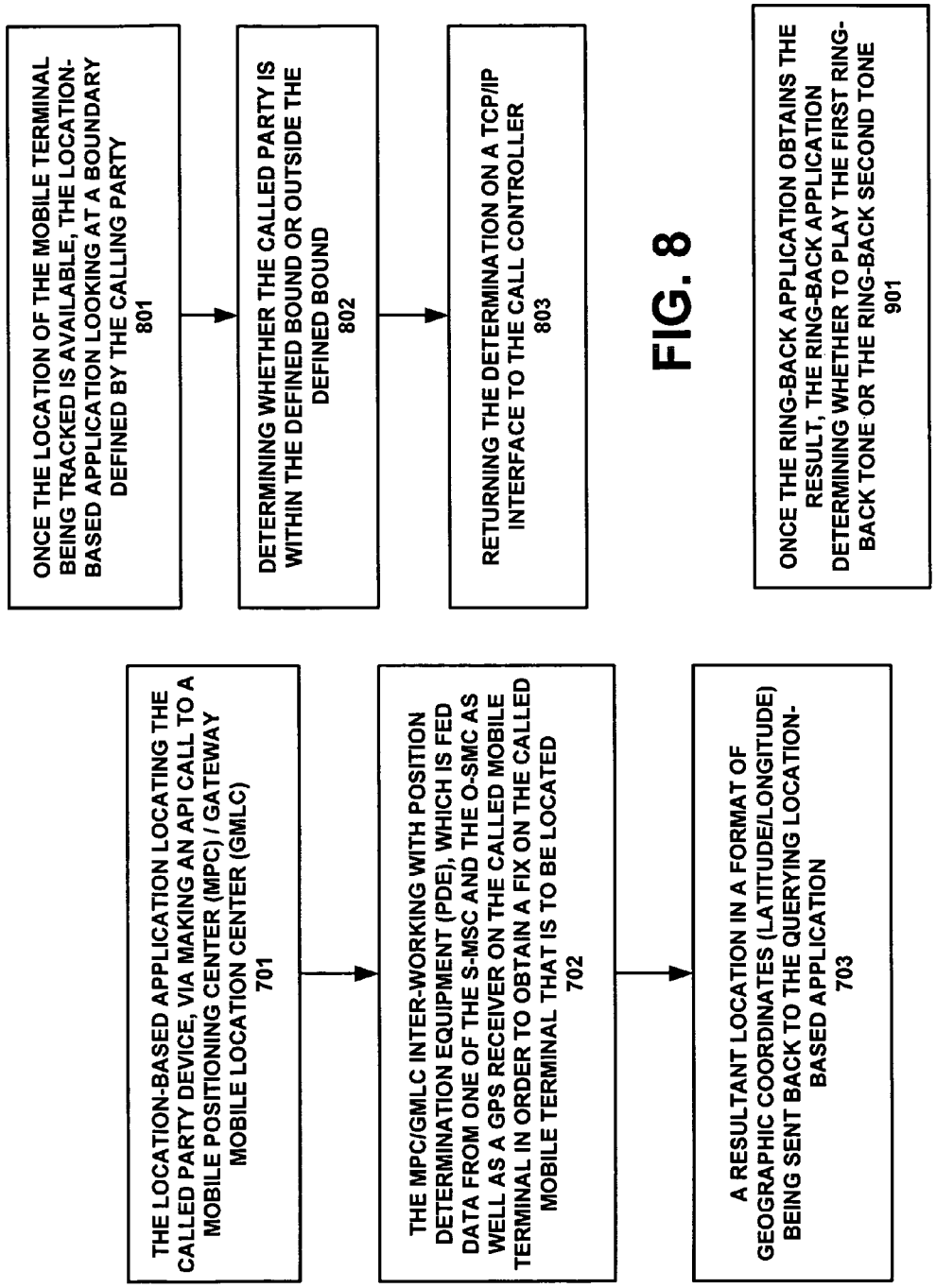
FIG. 7 depicts the FIG. 4 step of obtaining, a fix on a called mobile terminal.
FIG. 8 depicts the FIG. 4 step of determining a location of the called mobile terminal with respect to the geofence.
FIG. 9 depicts the FIG. 4 step of playing a relevant ring-back tone for the call based on the location of the called mobile terminal.

FIG. 7 depicts the FIG. 4 step of obtaining a fix on a called mobile terminal. It is to be understood that the "Geofencing" application just provides a fence; the location fix is not obtained by this application.

The location-based application locates the called party device, via making an API call to the MPC/GMLC (701). The MPC/GMLC inter-works with the PDE, which is fed data from the S-MSC (which, under certain cases can also be the O-MSC for an "at home" mobile subscriber) as well as a GPS receiver on the mobile terminal in order to obtain a fix on the called mobile terminal that is to be located (702). The resultant location in the format of geographic coordinates (latitude/longitude) is sent back to the querying location-based application (703).

FIG. 8 depicts the FIG. 4 step of determining a location of the called mobile terminal with respect to the geofence.

Once the location of the mobile terminal being tracked is available, the location-based application looks at the boundary defined by the calling party (party who starts the tracking) and tacitly agreed to by the called party (since, the called party would not agree to be tracked without entering calling-party information in his/her profile in the first place) (801). Without any loss of generality, it is assumed here that the definition of boundaries may be as simple as defining a radius (for example a predetermined number of miles from a predetermined location point) or as complicated as specifying an exact route of travel for the tracked party. The mode of definition of such bounds may be determined, for example, from a desktop device or hand-held device. The content and the mode of storage of such bounds may take many different forms as is in the various methods of storing data. It suffices to assume the existence of bounds defined by the tracking party that is relevant for the tracked party in the location-based application.

The geofence boundary is usually defined as set of geographic coordinate (latitude/longitude). If the boundary is defined by a set of street addresses, for geofencing calculation purposes, all street addresses are geo-coded into latitude and longitude.

In some embodiment, determination of whether the called party is within a defined bound or outside the defined bound may utilize an efficient algorithm (802). Various known algorithms may be used for this purpose. The outcome of this determination may be a Boolean: within the bounds/outside of the bounds. This result is returned on the TCP/IP interface to the SN/IP that hosts the ring-back solution (803).

FIG. 9 depicts the FIG. 4 step of playing a relevant ring-back tone for the call based on the location of the called mobile terminal. Once the ring-back application obtains the result it may be determined whether it should play the first ring-back tone or the second ring-back tone (901). It may be visualized here that the first tone and the second tone may be indicative in nature so that the calling/tracking party knows that the tracked party is within bounds or out of bounds. For instance, first tone may be "Right here waiting for you" and the second tone may be "This bird has flown". But in general, it is up to the mutual understanding between the calling party and the called party.

Geofencing, as has been explained above, is geared towards a different segment of users. In general, it requires the use of a desktop (or a handheld smart device) to track a specific person or object in motion (or otherwise). It is considered a very technical application, generally not suitable for the common population.

In comparison, the embodiments of the present method and apparatus combine the geofencing and the ring-back tones to provides a simple-to-understand audio interface that lets a tracking party determine very easily if the tracked party is within the pre-determined bounds. The tracking party does not need the use of a computer or a smart device either; the audible ring-back tone is indicative in nature to let the tracking party know the result of the tracking. In addition, the tracking party does not need any elaborate preparation to determine the location of the tracked party. A simple phone call to the called party is all it takes for the calling party to know.

Also, in contrast to the prevalent geofencing techniques, which result in generating a lot of network queries to locate/track the target, here, the calling/tracking party makes an explicit call to track the called party, also known as polling. The rationale for such polling is that typically a tracking party may not want to continually track the called party, but only when, for example, a deadline comes up. For instance, a parent may want to track a teenage child around a "curfew" hour, such as 11:00 PM.

The synergy of ring-back application and location-based application provides a compelling differentiation to either service. It bridges the gap for both services, ring-back becomes an attractive proposition, for example, to the parents of teenage children, usually not a target segment for services like ring-back and geofencing.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a polled geofencing system associated with at least one caller definable predetermined area having a predetermined boundary; and
at least one predetermined specialized ring-back tone having a functional relationship with the at least one predetermined boundary;
wherein the at least one predetermined specialized ring-back tone alerts a designated calling party to a location, relative to the at least one predetermined boundary as determined by the polled geofencing system, of a called party during a call setup between the designated calling party and the called party; and
wherein the called party location is determined only during the call setup.

2. The apparatus according to claim 1, wherein the geofencing system comprises a location based application.

3. The apparatus according to claim 1, wherein the geofencing system comprises a GPS system.

4. The apparatus according to claim 1, wherein the predetermined area is a closed area defining an area inside the boundary and an area outside the boundary.

5. The apparatus according to claim 1, wherein the predetermined area is a route, and wherein the boundary is at least one segment of the route.

6. An apparatus, comprising:
a telecommunication network having a tracking calling terminal and a tracked called terminal;
a polled geofencing system associated with at least one caller definable predetermined area having a predetermined boundary, the tracked called terminal having a location relative to the predetermined boundary; and
at least first and second predetermined ring-back tones having a functional relationship with the at least one predetermined boundary, the first predetermined ring-back tone being utilized when the tracked called terminal is within the predetermined boundary, and the second predetermined ring-back tone being utilized when the tracked called terminal is outside of the predetermined boundary;
wherein the at least first and second predetermined ring-back tones alert the tracking calling terminal to a location, relative to the predetermined boundary as determined by the polled geofencing system, of tracked called terminal during a call setup between the designated tracked called terminal and the tracking calling terminal; and
wherein the called party location is determined only during the call setup.

7. The apparatus according to claim 6, wherein the geofencing system comprises a location based application.

8. The apparatus according to claim 6, wherein the geofencing system comprises a GPS system.

9. The apparatus according to claim 6, wherein the caller definable predetermined area is a closed area defining an area inside the boundary and an area outside the boundary.

10. The apparatus according to claim 6, wherein the caller definable predetermined area is a route, and wherein the boundary is at least one segment of the route.

11. A method, comprising:
one of defining a geofence for a call, and using a previous caller definable geofence;
determining that a ring-back service is active for a call;
extending the call to a ring-back tone platform and determining applicability of geofencing;
obtaining a fix on a called mobile terminal;
determining a location of the called mobile terminal with respect to a geofence; and
playing a relevant ring-back tone for the call based on the location of the called mobile terminal; and
wherein the called mobile terminal location is determined only during the call setup.

12. The method according to claim 11, wherein the geofence is determined by a polled geofencing system.

13. The method according to claim 11, wherein the step of extending the call to a ring-back tone platform and determining applicability of geofencing, comprises:
for a designated calling party only, if the called party is within a specified boundary, a first predetermined ring-back tone being played, and if the called party is outside of the specified boundary, a second ring-back tone being played; and
a ring-back application making a query, via a TCP/IP link, to the location-based application in order to choose between the first tone and the second tone.

14. The method according to claim 13, wherein the step of obtaining a fix on a called mobile terminal, comprises:
the location-based application locating the called party device, via making an API call to a Mobile Positioning Center/Gateway Mobile Location Center;
the Mobile Positioning Center/Gateway Mobile Location Center inter-working with Position Determination Equipment, which is fed data from the serving mobile switching center as well as a GPS receiver on the called mobile terminal in order to obtain a fix on the called mobile terminal that is to be located; and
a resultant location in a format of geographic coordinates (latitude/longitude) being sent back to the querying location-based application.

15. The method according to claim 14, wherein the step of determining a location of the called mobile terminal with respect to the geofence, comprising:
once the location of the mobile terminal being tracked is available, the location-based application looking at a boundary defined by the calling party;
determining whether the called party is within the defined bound or outside the defined bound;
returning the determination on a TCP/IP interface to the call controller.

16. The method according to claim 15, wherein the step of playing a relevant ring-back tone for the call based on the location of the called mobile terminal, comprising:
once the ring-back application obtains the result, the ring-back application determining whether to play the first ring-back tone or the second ring-back tone.

17. The method according to claim 15, wherein the geofence is a defined boundary that is circular and has a predetermined radius and a predetermined center location point.

18. The method according to claim 15, wherein the geofence is a defined boundary that is an exact route of travel for the tracked party.

19. The method according to claim 15, wherein the geofence is a defined boundary that is a closed loop.

20. An apparatus, comprising:
first system module configured for one of defining a geofence for a call, and using a previous caller definable geofence;
second system module configured for determining that a ring-back service is active for a call;
third system module configured for extending the call to a ring-back tone platform and determining applicability of geofencing;
fourth system module configured for obtaining a fix on a called mobile terminal;
fifth system module configured for determining a location of the called mobile terminal with respect to the geofence; and
sixth system module configured for playing a relevant ring-back tone for the call based on the location of the called mobile terminal; and
wherein the called mobile terminal location is determined only during the call setup.

21. The apparatus according to claim 20, wherein the geofence is a defined boundary that is circular and has a predetermined radius and a predetermined center location point.

22. The apparatus according to claim 20, wherein the geofence is a defined boundary that is an exact route of travel for the tracked party.

23. The apparatus according to claim 20, wherein the geofence is a defined boundary that is a closed loop.

* * * * *